United States Patent Office 2,918,156
Patented Dec. 22, 1959

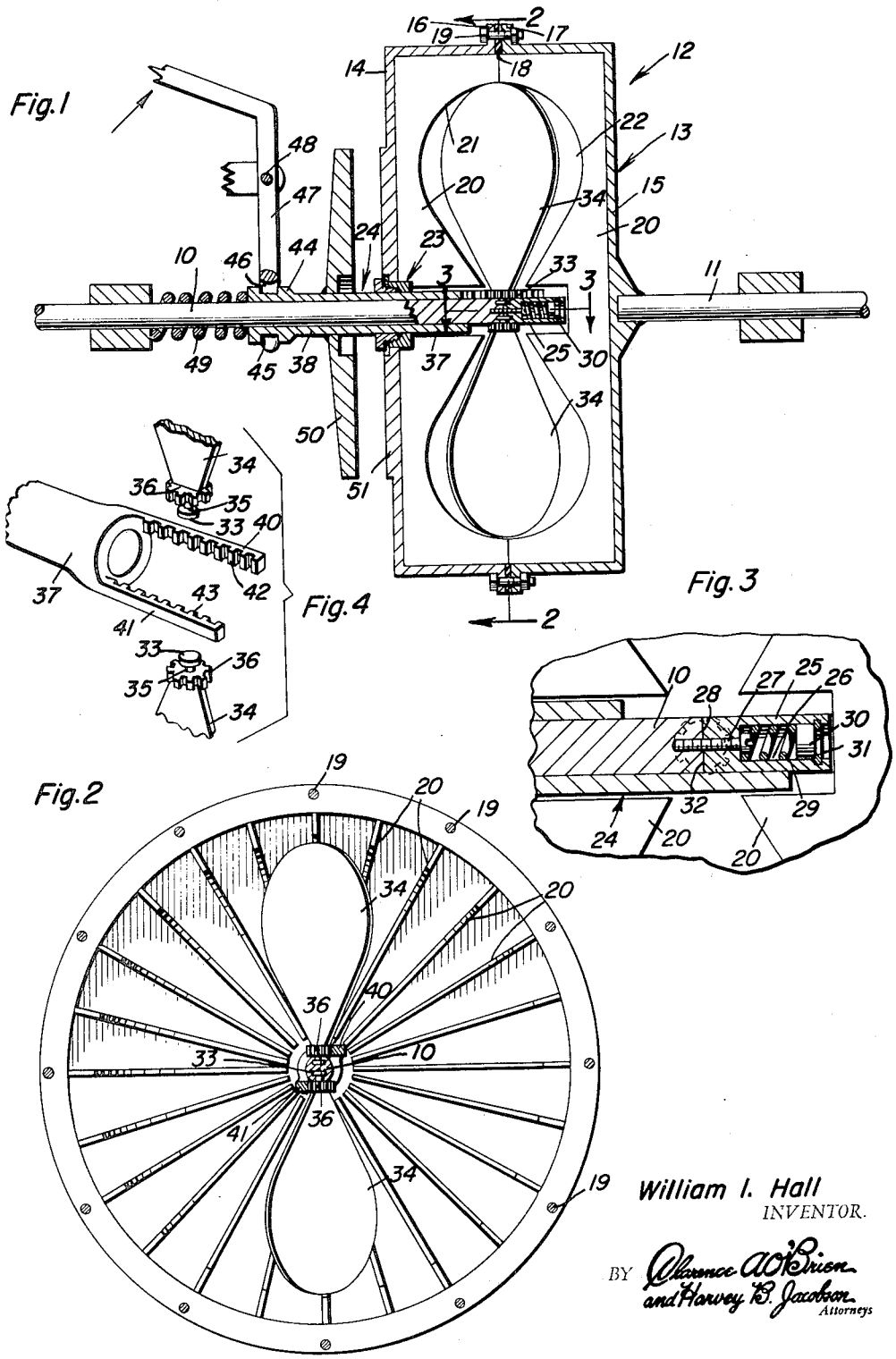

2,918,156

FLUID COUPLING

William I. Hall, Orangevale, Calif.

Application January 17, 1958, Serial No. 709,521

11 Claims. (Cl. 192—3.2)

This invention relates in general to fluid coupling devices and more particularly to a device of such character constructed so as to selectively vary the drive coupling.

In contemporary automobile vehicles, the automatic transmission has come into wide usage and it is primarily in conjunction with such types of power transmission that the instant device is intended. However, it is to be understood that other and different uses can be made of the present invention. With most automatic transmission systems presently in use, a fluid coupling is interposed between the engine crankshaft and the main shaft of the transmission and in many cases such coupling is of the torque multiplying type. It is of foremost concern in connection with this invention to provide a fluid coupling particularly adapted for use in conjunction with automatic transmissions wherein the coupling device is characterized by having the ability to be selectively varied as to the degree or amount of drive imparted between the driven and driving shafts.

Another object of this invention is to provide, in a device of the character described, means for effecting a positive engagement or lock-up between the drive and driven shafts.

A further object of this invention is to provide a device in accordance with the preceding objects which is of relatively simple and economical and yet fully effective construction.

Still another object of this invention is to provide improvements in fluid coupling devices incorporating a plurality of impeller blades operating within a coupling cavity and having means associated therewith for selectively varying the pitch of the impeller blades to change the drive characteristics of the coupling device.

Another object of this invention is to provide an improved fluid coupling device embodying a drive shaft having a plurality of radially projecting impeller blades thereon rotatable with the drive shaft and also rotatable about axes disposed radially thereof to vary the pitch of the impeller blades and wherein a sleeve is provided on the driveshaft, shiftable therealong, for selectively varying the pitch of the impeller blades.

Still another object of this invention is to provide an improved fluid coupling device in conformity with the preceding object wherein the sleeve is provided with a clutch disk rigidly mounted thereon and being shiftable with the sleeve toward and away from a cooperating friction surface and being so operated in conjunction with the sleeve that a positive drive or lock-up is effected when the impeller blades are in their position of maximum pitch.

Still another object of this invention is to provide an improved fluid coupling device incorporating a driveshaft operating within a casing having a vaned cavity therein and wherein the driveshaft is provided with a plurality of radially projecting impeller blades rotatable about their longitudinal axes for varying the angle of pitch thereof and wherein a shiftable sleeve operates on the driveshaft within the casing to selectively vary the pitch of the blades and wherein an expansion chamber is provided to accommodate for volumetric changes within the casing as effected by the shifting of the sleeve therewithin.

Still another object of this invention is to provide an improved fluid coupling device incorporating a driveshaft having a plurality of impeller blades mounted thereon and projecting radially therefrom and with the blades being rotatable about their longitudinal axes for selectively varying the pitch thereof, there being a sleeve associated with the driveshaft in surrounding relation thereto and shiftable therealong and having longitudinally extending and projecting rack elements rigid therewith engageable with pinion elements on the blades whereby shifting of the sleeve along the driveshaft effects a variation in the pitch of the blades.

Still another object of this invention is to provide an improved fluid coupling device employing a shiftable sleeve for varying the pitch of a plurality of impeller blades on a driveshaft and the motion of which sleeve is also utilized to effect the clutching action between the drive and driven shafts at the point of maximum pitch of the impeller blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal section taken through the fluid coupling device constructed in accordance with this invention and illustrating details of the internal construction thereof with the clutch plate and the impeller blades shown in an intermediate position;

Figure 2 is a vertical transverse section taken substantially along the plane of section line 2—2 of Figure 1 and showing the disposition of the vanes in the casing and illustrating the association of the impeller blades with respect thereto;

Figure 3 is an enlarged horizontal section taken substantially along the plane of section line 3—3 in Figure 1 and illustrating details of the expansion chamber; and Figure 4 is an exploded perspective view of inner end portions of the impeller blades and the associated shifting sleeve and illustrating details of the construction by which the pitch of the impeller blades is varied.

Referring at this time more particularly to Figure 1, reference numeral 10 indicates a driveshaft whereas the reference numeral 11 indicates a driven shaft. In a specific application of this invention, the shaft 10 is connected to the crankshaft of an internal combustion engine whereas the shaft 11 either forms the main shaft or is connected to the main shaft of an automatic transmission device.

The construction which couples the driven and driveshafts 11 and 10 together is indicated in general by the reference character 12 and will be seen to consist essentially of a generally cylindrical casing 13 formed of two complemental half-sections 14 and 15, each provided with a peripheral flange 16 and 17 which are disposed in face-to-face relation with each other and which sandwich therebetween a suitable gasket element 18 and are physically connected by the fasteners or bolts 19 as is shown.

Each half or section 14 and 15 is formed internally thereof with a plurality of radially disposed vanes 20, see particularly Figure 2, and the inner edge of each of such blades is dished or cut away as indicated by the reference character 21 so that when the two half sections of the casing or housing are bolted together, the vanes provide and form a cavity 22 which is generally centrally disposed with respect to the casing 13.

The driveshaft 10 projects into the casing 13 along the central axis thereof and centrally with respect to the vanes 20. Since the casing 13 is adapted to be filled with a hydraulic fluid or the like, a packing gland or nut indicated by the reference character 23 is employed to prevent leakage of the fluid outwardly of the casing, the packing in the gland engaging the outer surface of sleeve 24, hereinafter more particularly described.

The inner end of shaft 10 is provided with a removable end section 25, see particularly Figure 3, which end section is in turn provided with a recess 26 opening inwardly from the free end thereof and within which recess is located a retaining bolt 27 or the like which serves to removably secure the end section onto the corresponding end face 28 of the shaft 10. A compression spring 29 is bottomed within the recess 26 and engages against the piston element 30 retained in the recess by means of the split ring or circlip 31, the purpose of this construction being presently apparent.

Between the end face 28 of the shaft 10 and the corresponding end face 32 of the removable end section 25, there is provided a plurality of pockets as is shown most clearly in Figure 1 which rotatably receive the enlarged head portions 33 of a plurality of impeller blades 34. The inner end of each blade 34, as can be seen most clearly in Figure 4, is provided with a cylindrical stem 35 which joins the enlarged head 33 with the main body portion of the blade and also provided at the inner end of each of the blades is a pinion 36 which is rigid therewith and which, as will be presently seen, forms part of the means by which the impeller blades 34 may be rotated about their longitudinal axes to vary the pitch thereof within the chamber 22 so as to vary the drive characteristics imparted between the driveshaft 10 and the driven shaft 11.

A previously mentioned sleeve 24 surrounds the driveshaft 10 and includes an inner portion 37 projecting within the casing 13 and outer portion 38 normally disposed outside the casing. Integral with or carried by the inner portion 37 of the sleeve are a plurality of rack elements 40 and 41 having teeth 42 and 43 thereon engageable with the aforementioned pinions 36 on the impeller blades 34.

It is to be noted that the rack elements 40 and 41 engage against the outer surface and extend along the driveshaft so that the teeth thereof are properly engaged with the pinions 36. In this manner, when the sleeve 24 is shifted back and forth on the driveshaft 10, the impeller blades 34 will be rotated about their longitudinal axes to vary the pitch angle thereof relative to the drive shaft. Consequently, by shifting the sleeve 24, it will be readily apparent that a variation in the drive characteristics within the casing is achieved.

The outer end 38 of the sleeve 24 is provided with an enlarged collar portion 44 having an annular recess 45 therein within which the legs 46 of a shifting fork 47 are disposed, the shifting fork being suitably pivoted as at 48 such that rocking motion imparted thereto will effect longitudinal sliding of the sleeve 24 on the driveshaft 10. Normally, a compression spring 49 is provided in order to urge the sleeve inwardly with respect to the casing 13 in which position the impellers 34 will be disposed in their position of maximum pitch to effect the most efficient drive therefrom to the casing 13.

In order to effect a positive drive or lock-up between the drive and driven shafts 10 and 11, a friction clutch plate 50 is rigidly affixed to the sleeve 24 for cooperation with a friction surface 51 formed on the outer side of the casing 13. The disposition of the clutch plate 50 on the sleeve 24 is such that when the impeller blades 34 have moved to their positions of maximum pitch, the friction clutch will be operative to effect a positive interengagement between the sleeve 24 and the casing 13, thus achieving a positive drive between the drive and driven shafts. In the particular embodiment shown, the sleeve 24 is non-rotatable in respect to the shaft 10 by virtue of the disposition of the rack elements 40 and 41 in engagement with the pinions 36 of the impeller blades 34 but it will be realized that separate means may be provided to effect a non-rotatable but slidable relationship between the driveshaft 10 and the sleeve 24.

The aforementioned piston element 30, in conjunction with the recess 26 in the end section 25 of the driveshaft effects an expansion chamber for accommodating for variations in the volumetric content of the casing 13 as occasioned by movement of the sleeve 24 further into or out of the casing, such as the case may be. In other words, it will be appreciated that as the sleeve 24 is moved inwardly to effect a greater pitch to the impeller blades 34, the volume within the casing 13 displaced thereby will be compensated for by movement of the piston 30 inwardly of the recess 26, the fit of the piston 30 within the recess 26 being such as to prevent leaking of hydraulic fluid therepast such that the space between the inner face of the piston 30 and the bottom of the recess 26 will normally contain only a quantity of air which is of course sufficiently compressible to allow the aforementioned compensating action to take place. It is to be understood that the volume displaced by the movement of the piston 30 between an outer limit position and an inner limit position within the recess 26 is greater than that which is displaced by the inward movement of the sleeve 24. Therefore, the fluid displaced by the inward movement of the sleeve 24 may be fully compensated for by the inward movement of the piston 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid coupling device comprising a casing having a plurality of radially disposed vanes therein defining a cavity and adapted to receive a supply of hydraulic fluid, said casing including power take-off means, a driveshaft journalled with respect to and extending into said casing centrally of said vanes, a plurality of impeller blades carried by said driveshaft for rotation within said cavity, means on said driveshaft for selectively varying the pitch of said blades including means positively coupling said driveshaft to said casing when the blades have achieved the position of their maximum pitch.

2. A fluid coupling device comprising a casing for receiving a supply of hydraulic fluid, a plurality of radially disposed vanes fixed within said casing and defining a cavity therein, said casing including power take-off means, a driveshaft journalled in said casing and including a portion extending centrally within said cavity, a plurality of impeller blades carried by said driveshaft for rotation therewith within said cavity, means on said shaft engaging said blades for selectively varying the pitch thereof and including mechanism for positively connecting the driveshaft to the casing when said blades have achieved the position of their maximum pitch whereby said driveshaft will be directly connected to said power take-off means.

3. A fluid coupling device comprising a casing for receiving a supply of hydraulic fluid and including power take-off means, a plurality of radially disposed vanes fixed within said casing and forming a cavity therein, a shaft extending into said casing and carrying a plurality of impeller blades for rotation within said cavity, and means for varying the pitch of said impeller blades including mechanism positively connecting the driveshaft to the casing when said blades have achieved the position of their maximum pitch whereby said driveshaft will be directly connected to said power take-off means, said means including a sleeve slidable on said shaft having a plurality of rack elements rigid therewith, each of said impeller blades having a pinion rigid therewith and engaged with a respective one of said rack elements.

4. A fluid coupling device comprising a casing having a plurality of radially disposed vanes therein defining a cavity and adapted to receive a supply of hydraulic fluid and including power take-off means, a driveshaft journalled with respect to and extending into said casing centrally of said vanes, a plurality of impeller blades carried by said driveshaft for rotation within said cavity, means on said driveshaft for selectively varying the pitch of said blades and for positively coupling said driveshaft to said casing when said blades have achieved the position of their maximum pitch whereby said driveshaft will be directly connected to said power take-off means, the first mentioned means including a sleeve slidable on said driveshaft and having a plurality of longitudinally projecting racks extending from the inner end thereof, a pinion on each of said impeller blades engaged with a respective one of said racks.

5. A fluid coupling device comprising a casing for receiving a supply of hydraulic fluid, a plurality of radially disposed vanes fixed within said casing and defining a cavity therein, said casing including power take-off means, a driveshaft journalled in said casing and including a portion extending centrally within said cavity, a plurality of impeller blades carried by said driveshaft for rotation therewith within said cavity, means on said shaft engaging said blades for selectively varying the pitch thereof and including mechanism for positively connecting the driveshaft to the casing when said blades have achieved the position of their maximum pitch whereby said driveshaft will be directly connected to said power take-off means, said mechanism including a clutch disc slidable on said shaft and engageable with an outer face of said casing.

6. A fluid coupling device comprising a casing for receiving a supply of hydraulic fluid, a plurality of radially disposed vanes fixed within said casing and defining a cavity therein, said casing including power take-off means, a driveshaft journalled in said casing and including a portion extending centrally within said cavity, a plurality of impeller blades carried by said driveshaft for rotation therewith within said cavity, means on said shaft engaging said blades for selectively varying the pitch thereof and including mechanism for positively connecting the driveshaft to the casing when said blades have achieved the position of their maximum pitch whereby said driveshaft will be directly connected to said power take-off means, said means including a sleeve slidably disposed on said driveshaft having a plurality of longitudinally projecting racks extending from the inner end thereof, a pinion rigid with each of said blades engaged with a respective one of said racks, said mechanism comprising a clutch disc fixed to said sleeve and engageable with an outer face of said casing.

7. A fluid coupling device comprising a casing for receiving a supply of hydraulic fluid, said casing being of cylindrical configuration and having a plurality of interior vanes radially disposed with respect to its central axis and defining a cavity therewithin and having a power take-off means connected thereof, a driveshaft journalled in said casing and extending thereinto coincidental with its central axis, said driveshaft having a removable inner end section forming a plurality of pockets with the adjacent portion of said shaft, a plurality of impeller blades, each having an enlarged head journalled in a corresponding pocket and each extending radially from the shaft within said cavity, each of said blades having a pinion rigid therewith located immediately adjacent said shaft, a sleeve slidably disposed on said shaft and including a portion projecting within said casing, a plurality of racks rigid with said sleeve and extending therefrom along said shaft and in engagement with said pinions whereby axial movement of said sleeve along said shaft will effect rotation of said blades to selectively alter the pitch thereof, and a clutch disc fixed to said sleeve for engagement with said casing when said blades have achieved their greatest angle of pitch whereupon said driveshaft will be directly connected to said power take-off.

8. The assembly as defined in and by claim 7 including means forming an expansion chamber within said casing to accommodate for movement of the body of said sleeve within the casing.

9. The assembly as defined in and by claim 8 wherein the last mentioned means comprises a recess within said end section of the driveshaft, and a spring loaded piston movable in said recess.

10. The assembly as defined in and by claim 1 including means forming an expansion chamber within said casing to accommodate for movement of the body of said sleeve within the casing.

11. The assembly as defined in and by claim 10 wherein the last mentioned means comprises a recess within said end section of the driveshaft, and a spring loaded piston movable in said recess.

References Cited in the file of this patent

UNITED STATES PATENTS

| | | |
|---|---|---|
| 2,032,966 | Yoxall | Mar. 3, 1936 |
| 2,371,227 | Dodge | Mar. 13, 1945 |
| 2,533,148 | Speigel | Dec. 5, 1950 |
| 2,717,673 | Zeidler | Sept. 13, 1955 |

FOREIGN PATENTS

| | | |
|---|---|---|
| 388,880 | Great Britain | Mar. 9, 1933 |